United States Patent [19]
Mullins

[11] Patent Number: 5,955,666
[45] Date of Patent: Sep. 21, 1999

[54] SATELLITE OR OTHER REMOTE SITE SYSTEM FOR WELL CONTROL AND OPERATION

[76] Inventor: Augustus Albert Mullins, 600 Kenrick, Suite B11, Houston, Tex. 77060

[21] Appl. No.: 09/073,461

[22] Filed: May 6, 1998

Related U.S. Application Data

[63] Continuation-in-part of application No. 08/815,725, Mar. 12, 1997, Pat. No. 5,831,156.

[51] Int. Cl.[6] .............................. E21B 47/10; G01V 3/00
[52] U.S. Cl. .................................. 73/152.18; 73/152.31; 340/853.1; 340/853.2
[58] Field of Search ........................... 73/152.18, 152.26, 73/152.31, 152.52; 340/853.1–853.3

[56] References Cited

U.S. PATENT DOCUMENTS

| | | |
|---|---|---|
| 2,781,663 | 2/1957 | Maly et al. . |
| 4,015,194 | 3/1977 | Epling . |
| 4,461,172 | 7/1984 | McKee et al. ........................ 73/152.31 |
| 4,553,428 | 11/1985 | Upchurch . |
| 4,720,996 | 1/1988 | Marsden et al. ...................... 73/152.26 |
| 4,936,139 | 6/1990 | Zimmerman et al. ................ 73/152.26 |
| 5,132,904 | 7/1992 | Lamp . |
| 5,160,925 | 11/1992 | Dailey et al. ......................... 340/853.3 |
| 5,251,708 | 10/1993 | Perry et al. . |
| 5,273,112 | 12/1993 | Schultz . |
| 5,351,533 | 10/1994 | Macadam et al. . |
| 5,355,952 | 10/1994 | Meynier . |
| 5,553,492 | 9/1996 | Barrett et al. ......................... 73/152.26 |
| 5,774,420 | 6/1998 | Heysse et al. ........................ 340/853.1 |
| 5,808,557 | 9/1998 | Berge et al. .......................... 340/853.2 |

FOREIGN PATENT DOCUMENTS

WO 96/10123  4/1996  WIPO .

Primary Examiner—Hezron Williams
Assistant Examiner—Chad Soliz
Attorney, Agent, or Firm—Rosenblatt & Redano P.C.

[57] ABSTRACT

The downhole portion of the system of the present invention provides entirely downhole methods and apparatus for the monitoring and control of wells. The components of the system are modular. There are sensor and control valve components located in each of the multi-zone production intervals or lateral well completions. The production zones are isolated by production packers equipped with feed-through conductors for communication to upper system components. There are a monitor and control module containing a programmable microprocessor controller and a power supply module which are located at the uppermost end of the system. The system provides for removing, decommissioning and/or replacement of the power module or the monitor and control module without decompleting the well.

The surface portion of the system may be operated from the wellhead or by remote control. In a preferred embodiment, a surface-located test, question, or reprogram module is contained in a controlled buoyancy carrier mounted at the wellhead. The carrier is controlled by a surface control computer. The computer allows the controlled buoyancy carrier to "fall" down through the production tubing and "land" on the downhole monitor and control module. The carrier then interrogates the memory in the monitor and control module and/or reprograms its internal microprocessor as it has been instructed. The carrier then alters its own buoyancy to return via the production tubing to the surface. At the surface it reports the status or sends back the requested data it has gathered via the communications link to the operator.

33 Claims, 9 Drawing Sheets

SATELLITE OR OTHER REMOTE SITE SYSTEM FOR WELL CONTROL AND OPERATION

This application is a continuation-in-part of Ser. No. 08/815,725 filed Mar. 12, 1997, issued as U.S. Pat. No. 5,831,156 on Nov. 3, 1998.

BACKGROUND OF THE INVENTION

1. Field of the Invention

The present invention relates to a surface and downhole system for the control, monitoring and operation of a single or multiple wells. The downhole portion of the system is entirely self contained and once in place requires no communications, power or control function to be provided from the surface. The surface portion of the system communicates by movable module with the downhole portion of the system. The surface portion of the system itself is remotely addressable via satellite line, microwave line, or via land line. If desired, various components of the modular system may be interrogated, evaluated, and/or replaced independently of the well completion and production schedule.

2. Brief Description of the Prior Art

Many oil and gas wells being drilled at the present time are drilled through and have multiple perforation and producing zones. Additionally, particularly in offshore field development, the use of multi-lateral wells drilled from a single central well borehole have become an accepted practice. Each production zone, or lateral well of a multi-lateral system, has its own set of operating parameters. These parameters of pressure and flow rate are determined by the physical characteristics of the reservoir rock and the borehole conditions at each production zone, or lateral well, such as permeability, porosity, formation pressure, formation gas content, formation water content, etc. In other words, in present day well completion practice, a single well borehole may comprise a series or set of different production parameters of flow rate and pressure wherein each member of the series of set requires its own separate handling logic to optimize its production of hydrocarbon. In a typical well each producing zone may contain oil, water and gas. It is desirable to produce the maximum possible rate.

In recognition of these completion practices well control systems utilizing microprocessor logic circuitry both at the surface and downhole have been developed. In such prior art systems, ultimate control of the operating system has always heretofore been maintained from the surface. For example, U.S. Pat. No. 5,132,904 discloses a well control system having a microprocessor to monitor well pressure levels, timed sampling limits and their combination. The sensors are connected by wire to the microprocessor at the surface in this system. Similarly, is the disclosure of PCT International Publication No. WO 96/10123 published Apr. 4, 1996 a surface microprocessor is connected by wire to downhole pressure and flow sensors in several different completion zones of a well. In U.S. Pat. No. 5,273,112 a surface controller communicates with a downhole instrument set for measuring pressure and flow via an annulus pressure modulation system which utilizes annulus pressure as a communication conduit to the downhole instruments.

In the cases where communications to the surface are performed by wire, special production tubing is required having communication and power wire and protectors therefor run along its length from the surface to the downhole tool. This wire is a weak link in the system, even using the best of available protection systems due to short term mechanical stress placed on it, for example during installation, and due to longer term stress placed on it due to lengthy timewise exposure to borehole temperatures, pressures and chemical activity. Similarly, in the case where tubing or annulus pressure modulation systems are used to control downhole tool settings, very heavy and bulky high pressure pumping systems are required at the well head to perform the communication function. Such pressure pumping systems may not always be available in remote location and when they are, their use can be very expensive.

Accordingly, it would be very desirable to have an entirely self contained downhole well monitoring and control system. Such a system would be even more desirable if it were repairable without decompleting the well. Decompletion (or the cessation of fluid production) is presently required for repair of known well control systems, such as those previously mentioned. Killing the well requires loading the well with fluids that made a higher hydrostatic pressure than the reservoir pressure. This requires that the well be "unloaded" (or the fluid removed) in order to begin production again. This is very expensive, time consuming and the fluids used may damage the formation permanently, inhibiting optimum production from the well.

BRIEF DESCRIPTION OF THE INVENTION

The downhole portion of the system of the present invention provides entirely downhole methods and apparatus for the monitoring and control of wells. The components of the system are modular. There are sensor and control valve components located in each of the multi zone production intervals or lateral well completions. The production zones are isolated by production packers equipped with feed through conductors for communication to upper system components. There are a monitor and control module containing a programmable microprocessor controller and a power supply module which are located at the uppermost end of the system. The system provides for removing, decommissioning and/or replacement of the power module or the monitor and control module without decompleting the well. The system provides for connecting to and charging or recharging the power module in place in the borehole with the well in operation. The system provides for surface connection to and monitoring of the power module or the monitor and control module from the surface while the well is in operation. The system provides for updating or reprogramming the monitor and control module in place in the well borehole. Upper modules of the system can be placed out of service by appropriate connection of a replacement upper module above it in the system having a means for controlling switches inside the power or control module. The system modules also provide for a mechanical well completion which is substantially open to remedial operations through their center bores, thereby providing repair of the mechanical completion of the well (perforating, squeeze cementing, acidizing, etc) without the removal of any of the system modules. The system also allows for production tubing to be run in the well to assist in production or well parameter change.

For example, when formation pressure decreases or water production increases in a formation the well will begin to "load up" i.e. the produced fluids become too heavy for formation pressure to lift to the surface. In these cases it is customary to run smaller production tubing or insert gas lift valves or other artificial lift systems. The surface portion of the system may be operated from the well head or by remote control via a communications link such as microwave, satellite link or the like. A surface located test, question, or reprogram module is contained in a controlled buoyancy carrier mounted at the well head. The carrier is controlled by a surface control computer which is, in turn, in communication with the remote located human/machine operator of the entire production system. A production tubing string connects the downhole portion of the system to the surface located production manifold and fluid flow lines for carrying off produced fluids. When it is decided to query or change the operating parameters of the downhole reduction system, the command is sent via the communication link to the surface control computer. The computer temporarily shuts off well output at the surface manifold and allows the controlled buoyancy carrier to "fall" down through the production tubing and "land" on the downhole monitor and control module of the downhole system. The carrier then interrogates the memory in the monitor and control module and/or reprograms its internal microprocessor as it has been instructed. The carrier then alters its own buoyancy to return via the production tubing to the surface. At the surface it reports the status or sends back the requested data it has gathered via the communications link to the operator.

These and other features and advantages of the system of the present invention are best understood from the following detailed description thereof when taken in conjunction with the accompanying drawings. It will be understood that the drawings are intended as illustrative and not as limitative of the invention.

DETAILED DESCRIPTION OF THE PREFERRED EMBODIMENTS

Figure 1:
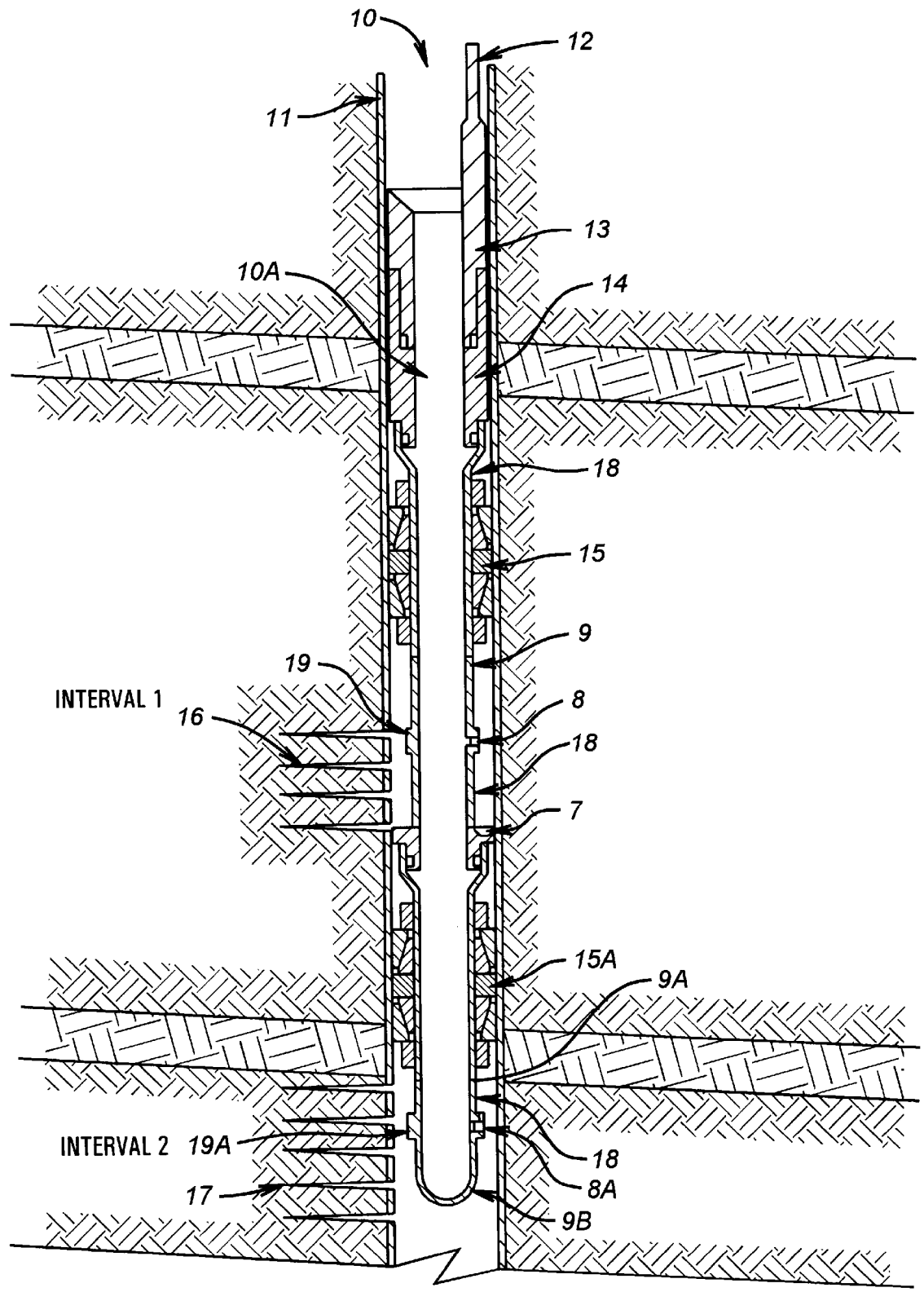
FIG. 1 is a schematic sectional view showing the downhole portion of a system according to the concepts of the present invention in a well borehole.

The production of hydrocarbons from a reservoir by a well penetrating one or more producing formations requires downhole production equipment to control the produced fluid flow. Production equipment usually includes a production tubing string to convey the fluid from each producing zone to the surface, well packers to isolate discrete producing zones, or lateral completions in the case of multi lateral wells from each other, and other tools such as pressure and flow sensors and valves to monitor and control fluid flow from each of the producing zones. Production operations may be complicated by variables such as multiple producing zones having different rock properties, fluid chemical composition, temperatures and pressures and fluid migration from one producing zone to another in the same completion set. All of these factors cause variable performance of each producing zone over time. There is a need to control a single zone to maximize hydrocarbon production and flow rate while reducing the production of water and while maintaining formation energy and pressure for producing the well. Prior art well control systems have, heretofore, not efficiently monitored and controlled these production variables in multiple completion sets.

Typically, downhole conditions in each producing zone have been monitored by a single gauge permanently installed in a side pocket mandrel above the production packer. The gauge is capable of measuring fluid pressure and temperature, which data is communicated to a surface control system via a dedicated wireline which is also permanently installed as part of the production tubing string, or the like. In some systems the gauge may be retrievable to the surface via a wireline or coiled tubing system used for that purpose.

Additionally to the need for monitoring well conditions, operating and control systems must provide a means for operating production control equipment, such as valves, in each separate producing zone. In some prior art systems hydraulic lines extending to the surface have been used to provide hydraulic power to remotely control downhole valve devices, or even safety valves. Typically such valves may be held in an open position when a hydraulic line is pressurized and be closed when the pressure is reduced or removed by a spring driven actuator. These systems thus require additional hydraulic lines be run to the surface which, again, provides a weak link in the system.

The system of the present invention will be described with respect to a well control system for a dual (or multi) zone production completed vertical single well borehole. It will be understood by those of skill in the art that the concepts of the downhole well control systems according to the invention may also be used for dual or multiple zone injection wells, if desired, or could be used to control dual or multiple lateral well boreholes in a multi lateral well completion system.

In the completion of a oil or gas well one of several types of "drive" mechanism provides the energy to produce the oil or gas. There are several types of "drive" mechanisms, of which there are three primary, these are Depletion Drive, Water Drive and Gas Drive. In all of these normal Drive mechanisms there is not a means of controlling the proportions of production of oil, water or gas on a continual basis. For this reason there is still large quantities of hydrocarbons remaining in reservoirs that are abandoned because they are considered not commercial.

In depletion drive systems the total energy to produce the hydrocarbon is contained in the hydrocarbon system itself. In this drive mechanism the compressed hydrocarbon in a fixed formation volume provides the energy for production. Generally this compressed energy will consist of the compression of the fluid (oil) or gas in solution (solution gas). As the well is produced it is not uncommon for solution gas to "break out of solution" and form a gas cap in the reservoir due to the difference in specific gravity of the oil and gas. In systems which form a gas cap as the gas is separated from the oil in the reservoir and if allowed to the gas is produced separately as free gas, while the oil continues to be produced. It would be a great benefit for the gas cap to form above the oil and continue to provide energy for the production of the oil without being produced itself. After the oil is produced the gas will flow easily to the surface and be fully produced with its own energy.

Gas caps formed above the oil column cause another problem at the intersection of the well bore and formation in both vertical and horizontal wells. The high pressure gradient at the formation wellbore intersection causes the fluid or gas with the highest relative permeability to flow much easier than fluids with lower relative permeabilties. It is a well known fact that formations have the highest relative permeability to gas, then water, and lastly oil. This means that the gas and water will encroach into the oil bearing formation at the well bore effectively reducing the flow of oil. In a gas drive system the gas is known to encroach or cone near the well bore and is generally described as "gas coning". Methods for producing the oil first in a gas drive system have consisted of perforating the formation at the lowest possible position in the formation which is exposed to the well in vertical wells or placing the well bore near the bottom of the oil column in a horizontal well. Another method used is to reduce the flow rate from the well. Other methods consists of remedial well operations whereby the perforations are squeeze cemented and new perforations made below the gas cap or gas producing perforations. These methods have not been successful as approximately 50% of the original oil found is still in place when reservoirs are abandoned as non-commercial.

In water drive systems water in the lower portion of the reservoir provides the energy for producing the oil or gas in the reservoir. Since water generally flows easier through the formation than does the oil and with a high pressure gradient existing at the well bore formation interface, the water like the gas, will begin to encroach into the oil bearing formation at the well bore effectively reducing the flow of oil. In this type of drive system the water is known to cone near the well bore and is generally described as "water coning".

The solution to both the gas and water coning problem would be to isolate the entire reservoir into intervals with packer or other isolation systems. These intervals could be monitored for gas and water production by means of a three phase flow meter or gas/water cut meter. Production from each interval could then be adjusted by incrementally opening or closing of a down hole control valve such as a side door or sliding sleeve valve located in each isolated interval to maintain the water or gas cut to within given parameters. Reducing the flow rate would decrease the pressure gradient near the well bore thereby preventing or reversing the tendency for the water or gas coning and decrease the water or gas portion of the production.

Another solution would be to divide the production interval into small portions by using packers or other isolation devices closely spaced within the well with sensors and a control valve in each of these smaller intervals. The sensors, like gas and water cut meters, could be monitored and the control valve incrementally opened or closed to adjust the production of oil/gas or oil/water in each of the intervals within a preset parameter.

When injecting fluids into a reservoir as a drive or displacement mechanism it is desirable for the fluid to be distributed throughout the well bore interval in order for fluid front to displace the oil that is in place in the reservoir to the producing well. This would mean that the fluid front would reach the entire well bore interval of the producing well at the same time thereby completely displacing the oil in the reservoir.

The problem is that due to permeability variations, injected fluids are not equally distributed throughout the well bore interval. In addition, there is not ideal communication through each perforation to the reservoir. This causes high volumes of injected fluids to find the path of least resistance and migrate to the neighboring producing well in a fashion known as channeling. Once this injected fluid progresses through the reservoir to the neighboring producing well this path becomes progressively easier for the injected fluid to flow through. In these situation large volumes of oil or by-passed by the displacing fluids. This causes operators to incur high costs for producing fluid and re-injecting the same again in the injecting well.

The solution to distributing the injection fluid over the entire injection interval is much the same as the producing well. The entire interval would be divided into small (short) intervals by using packers or other isolation systems with flow sensors and a control valve in each interval. By monitoring the flow rate in each interval, controlling the injection rate in each interval, the reservoir would be more evenly swept by the injected fluid.

Figure 2:
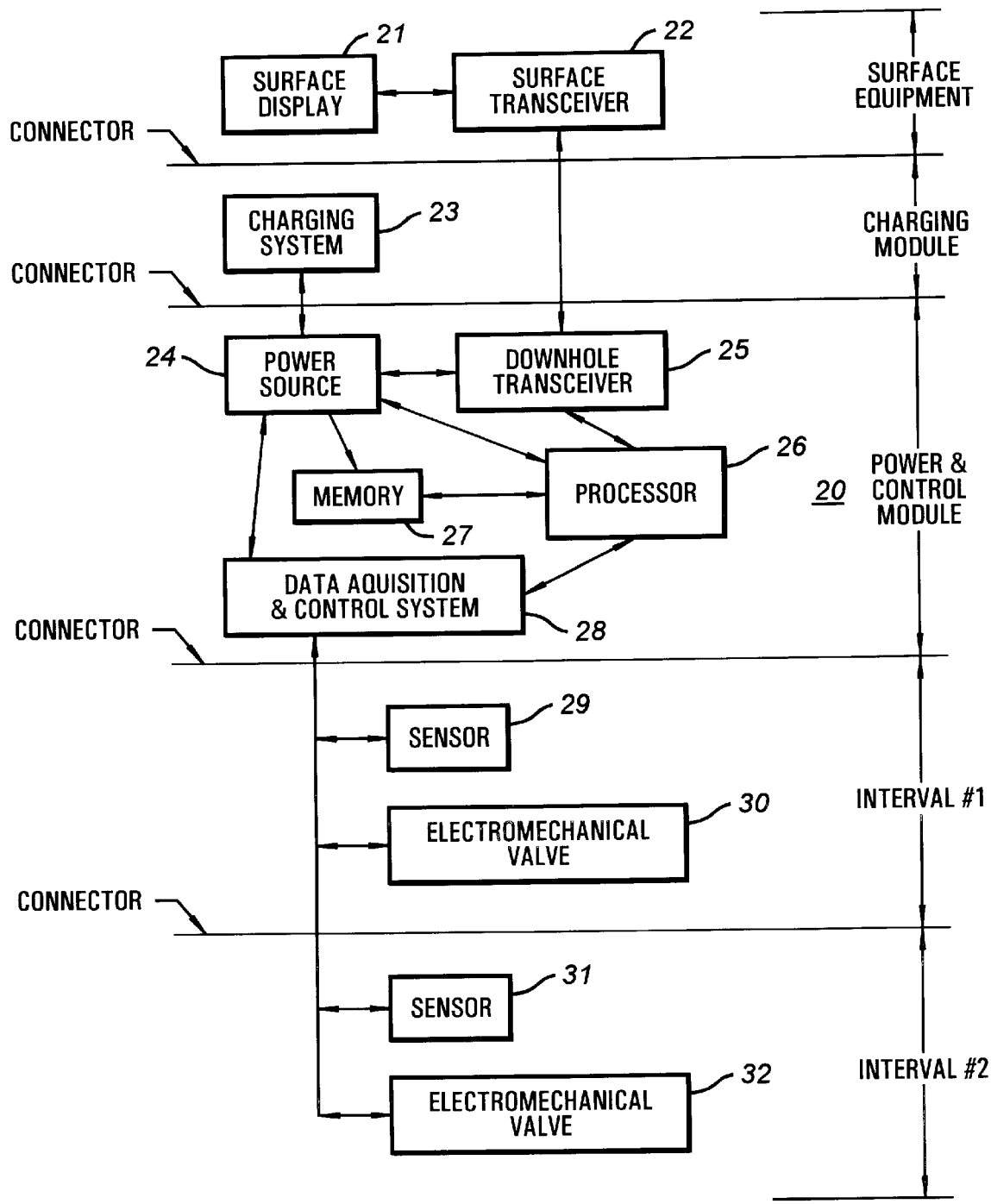
FIG. 2 is a block diagram showing the overall layout of a system according to concepts of the invention.

Referring initially to FIG. 2 a schematic diagram arrangement showing a well control system in accordance with the concepts of the invention is given. In the diagram of FIG. 2, two production zones or intervals labeled interval #1 and Interval #2 are shown downhole. These zones are isolated from each other and from the wellbore above by production packers (not shown here) which will be illustrated subsequently. In each isolated interval there is a sensor package and an electromechanical device. In interval #1 is sensor package 29 and electromechanical device 30. In interval #2 is sensor package 31 and electromechanical device 32. Sensor packages 29 and 31 include a temperature and pressure sensor such as the PANEX MICROBEAM® TORQUE CAPACITANCE SENSOR manufactured by PANEX Corp. of Houston, Tex., or the even more accurate model VANGUARD resonating quartz temperature and pressure sensor manufactured by Baker Oil Tools, Inc. of Houston, Tex. A water cut meter could be included. The electromechnical devices of packages 30 and 32 can include solenoid operated valves such as those described as manufactured by Petroleum Engineering Services of Houston, TX. The sensor and electromechnical devices are connected to the power and control module shown generally at 20 and located at the top end of the downhole tool string. The power and control module 20 comprises a power source 24 which can comprise a rechargeable battery of the series PMX1 50 or CSC93 type sold by the Electrochem Lithium Batteries of Wilson Greatbatch LTD. of Clarence, N.Y. or Battery Engineering Inc. of Hyde Park, Mass., together with a downhole telemetry transceiver 25 for communicating with the earth's surface. The power and control module 20 also includes a dedicated programmable microprocessor 26 and a memory unit 27 which may be a "FLASH" memory or EEPROM (electrically erasable programmable read only sensor) such as the Motorola 68HC16 family or the like. The microprocessor 26 could comprise, for, example, the Texas Instruments TMS320C240, which is capable of 20 MIPS operating speed in an extremely compact package. The flash memory requires extremely low operating power to retain its programmed data. The Texas Instruments TMS 320 series microprocessors each contain some "flash" memory in themselves (i.e. about 16K words). The supplemental memory 27 can be used to store historical well data for "uploading" to the surface in the future, if desired. The data acquisition and control system (DAC) 28 is essentially an interface between the microprocessor 28 and the analog sensors 29 and 31 and the electromechnical devices 30 and 32. This DAC receives control signals from the microprocessor 26 and formats and conducts these to the electromechnical valves 30 and 32 to control the fluid flow from intervals #1 and #2 into the production tubing. Similarity, the interface 28 receives measured pressure and temperature data from sensor packages 29 and 31 and digitizes and formats it correctly for presentation to the microprocessor 26.

The separation line in FIG. 2 separates the downhole system components which are permanently installed in the well borehole from the optional surface components of the system. For example, a charging unit 23 may be lowered into the well periodically (an interval of weeks or months) to recharge the downhole battery or power source 24. Also, if desired, a surface transceiver 22 and a surface display system 21 may be linked via a running tool and diagnostic system to receive data generated by the downhole telemetry transceiver and to conduct new operating instructions (i.e. reprogram the microprocessor) to processor 26, if desired. The surface display system may comprise a video monitor, a printer, a fax system or whatever data recording device is desired.

Referring now to FIG. 1 the mechanical layout of the system of FIG. 2 is shown in a highly schematic, sectional view in a well borehole. In the view of FIG. 1 the production tubing string which normally would conduct produced fluids to the surface has been removed and pulled from the borehole 10. The borehole 10 is lined with a steel casing 11. A conductor string 12, which may comprise coiled tubing housing several electrical conductors or armored multi-conductor cable if desired, is used to lower and stab into the uppermost module of the completion system, which is a running tool and diagnostic system sub assembly 13. The diagnostic sub 13 contains the necessary interface and charging system to run tests on the permanently installed down hole system from power and control sub 14 on down to the bottom of the hole. Such tests may, if desired, be conducted as each module is sequentially installed. It will be noted that each of the downhole subs has a permanently open center bore 10A passing through it. This enables fluid production to continue even as some system components are repaired or replaced. The power and control sub 14 is shown in the drawing FIG. 1.

Below the power and control module 14 and sealingly attached thereto is upper packer module 15. This together with lower packer module 15A and the seal sub 7 isolate perforations 16 of Interval #1 from the perforations 17 of interval #2 below. A spacer sub 9 contains an electromechnical control valve 8 of the type previously described and also houses a sensor package 19 of the type previously described which are use to sense and control fluid flow conditions in interval #1. Similarity a second spacer sub 19A, having a sealed lower end 9B, is equipped with a corresponding sensor package 9A and a control valve 8A. All of the system components are electrically connected by conductors 18 comprising the control line. The mechanical form of these will be discussed in more detail subsequently.

Figure 3:
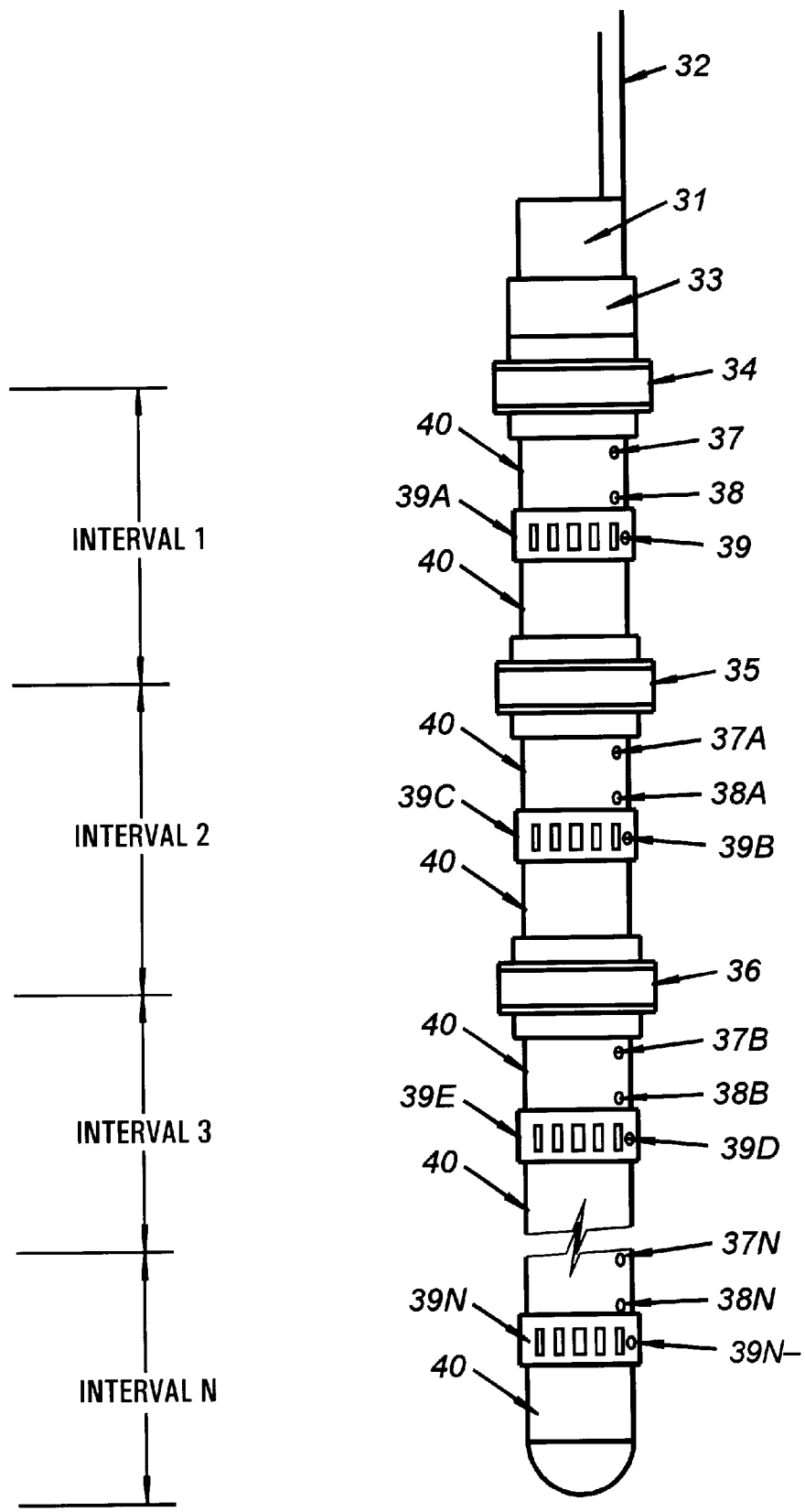
FIG. 3 is a schematic diagram illustrating the mechanical layout of the system of FIG. 2.

While FIGS. 1 and 2 describe the system with respect to two production intervals, it is apparent that the same concepts may be utilized and extended to sense and control operating conditions on three or more intervals, if desired. The control of only one interval is important to optimize production of the desired hydrocarbon. FIG. 3 schematically shows a perspective view of this extension of up to N (integer) stages. In FIG. 3 a running tool and diagnostic system is shown at 31 connected to the surface via coiled tubing 32. The power and control module of the system is shown at 33. Packers 34, 35, 36 and etc. are used to isolate production zones as previously described. Sensors 37, 38, and 39 are provided on a spacer sub 40 as previously described. The sensor 37 may be a pressure sensor as previously described as is sensor 38. Sensor 39 can be a position sensor on the motor driven valve 39A used to control fluid flow into the central opening of the system modules. Similar sensors 37A, 38A, 39B etc to 37N, 38N and 39N may be placed in each of N intervals of the well being controlled by the control sub 33 of FIG. 3.

Figure 4C:
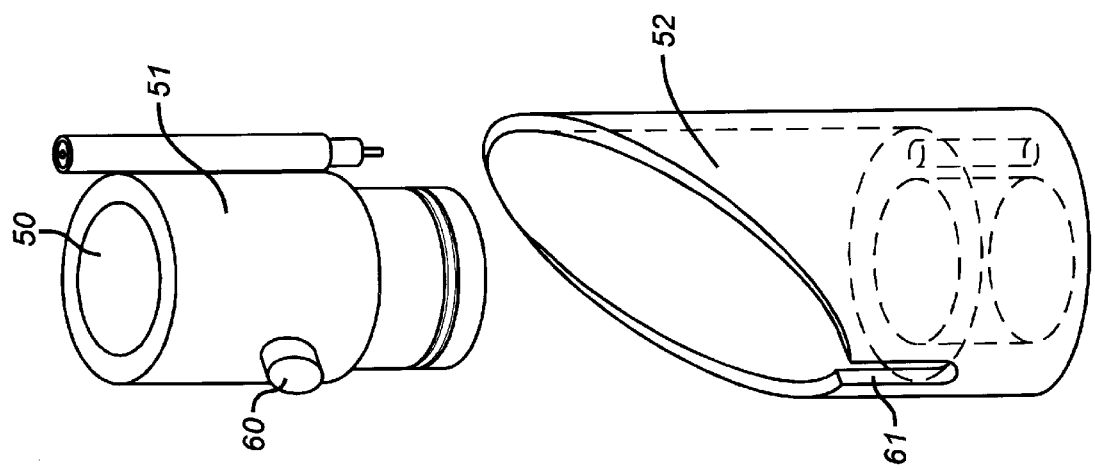
FIGS. 4A–4C are schematic sectional views showing different embodiments of connectors useful with modular components according to the invention.
Figure 4B:
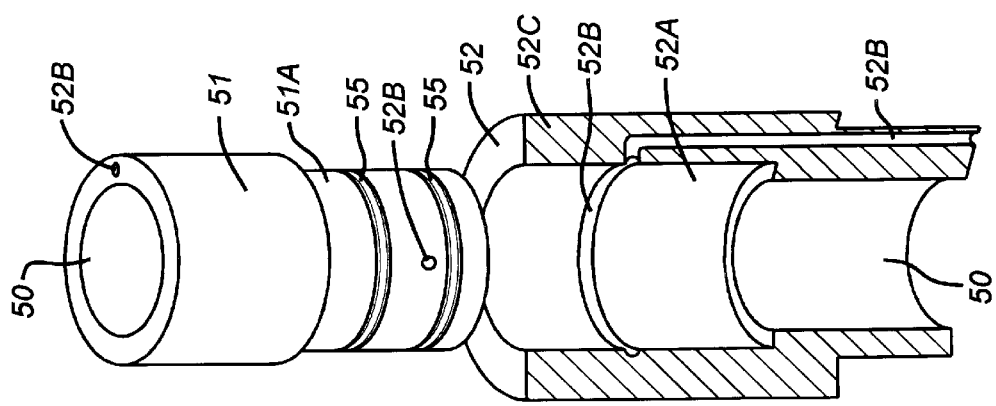
Figure 4A:
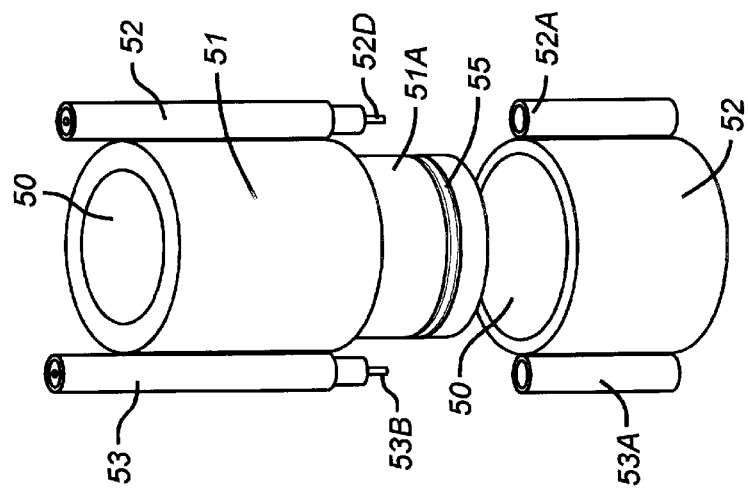

Referring now to FIGS. 4A, 4B, and 4C several alternative mechanical arrangements are shown for making up different connectors for joining various modules or components of the system of the present invention. In FIG. 4A two lines 52A and 53A, whether hydraulic or electric, are connected from an upper module 51 to a lower module 52 each having corresponding center bores 50. The upper module 51 has a smaller diameter lower portion 51A which is grooved to accept O ring seals 55. This lower portion 51A is stabbed into the lower module 52. Simultaneously upper hydraulic or electric lines 52 and 53 following smaller diameter guides 52D and 53B which enter bores in line continuations 52A and 53A provide fluid tight hydraulic and/or electric connections between the modules.

In FIG. 4B a similar arrangement is shown but having only a single electrical or hydraulic connection 52B which is above and within the wall of the module 51 as shown. The lower module 52 shown in section receives the reduced diameter portion 51A of the upper module 51 which has the electric or hydraulic connection 52B disposed between a pair of O-ring seals 55. This is received by a fluid groove 52B connected to a bore 52B in the wall of lower module 52. Again, when joined, a continuous center bore 50 is formed between the two modules.

In FIG. 4C a similar arrangement to either FIG. 4A or FIG. 4B is shown. Here, however, when the smaller diameter portion of the upper module 51 is stabbed into the lower module 52 an alignment lug 60 on the upper module enters an alignment slot 61 on the lower module 52, thereby establishing a selected circumferential orientation of both modules 51 and 52 with respect to each other.

Figure 5B:
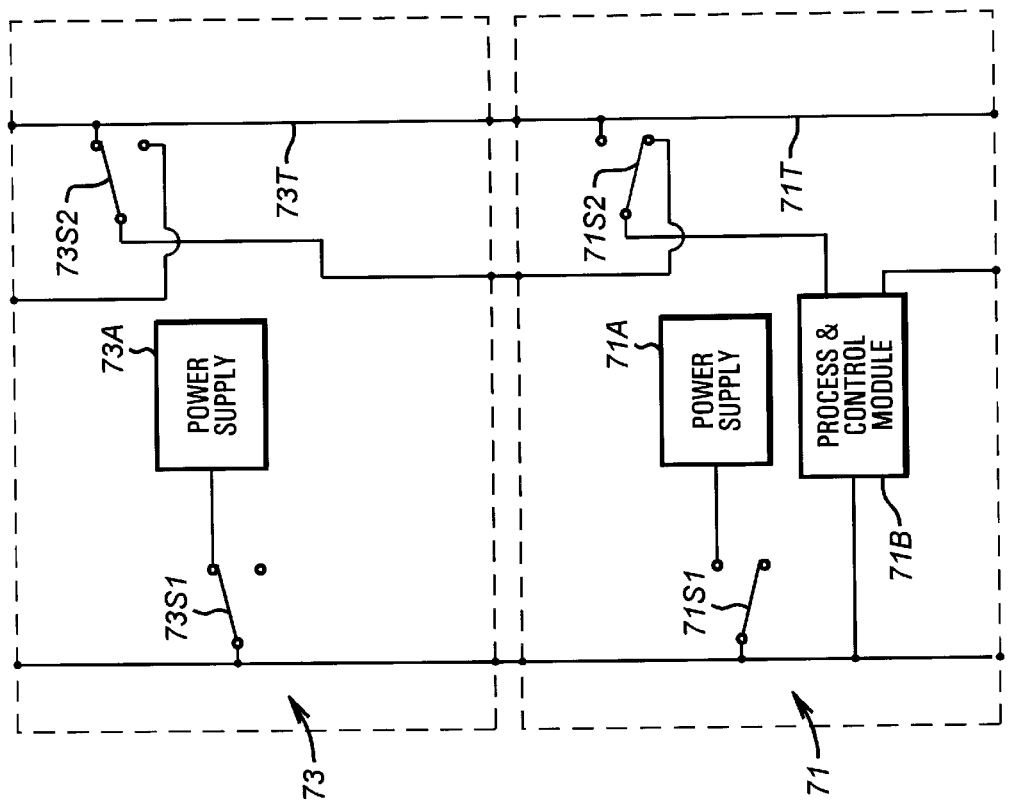
FIGS. 5A and 5B are a schematic block diagrams illustrating power supply and control module switching arrangements according to one embodiment of the invention.
Figure 5A:
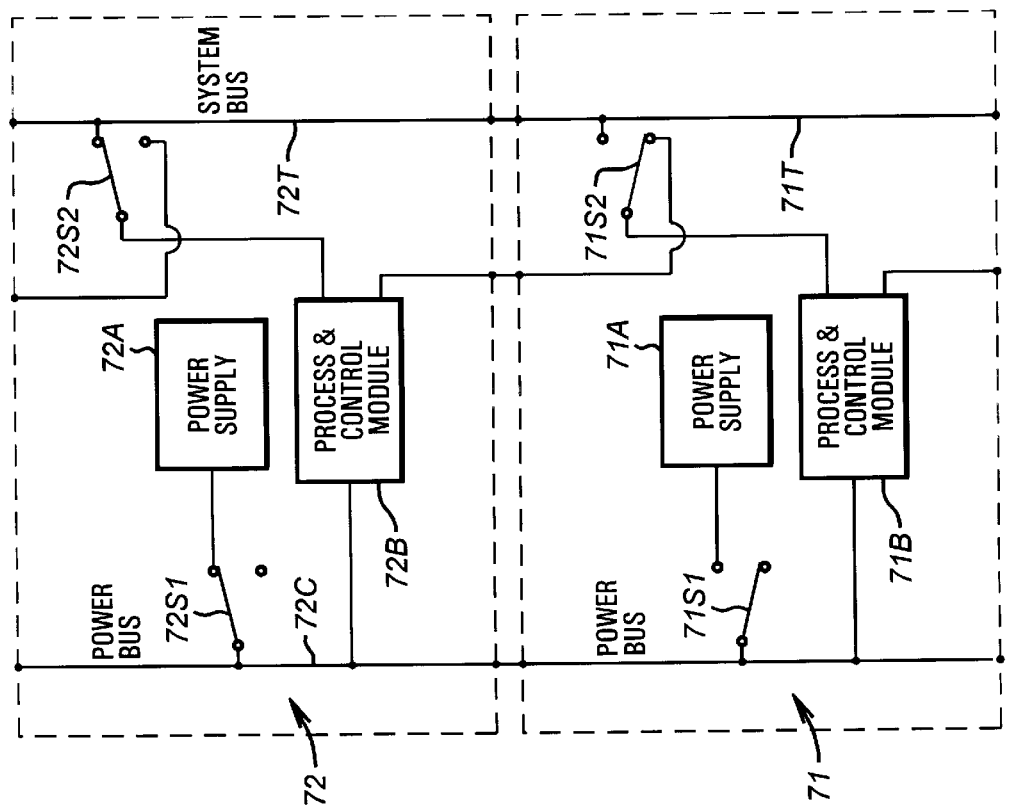

Referring now to FIGS. 5A and 5B a switching arrangement whereby when a new upper module (i.e. Corresponding to a new power and control sub 14 of FIG. 1) is plugged into the top of the system it automatically disconnects and places out of service the previous power and control sub being used by the system. In FIG. 5A, an original power and control sub 71 has been in use in the system. It is powered by its power supply 71A which is also connected to the remaining system modules located below it by power buss 71C and switch 71B in the up position. When module 72 replaces original power and control module 71, it operates off its internal power supply 72A which supplies power to its process control module 72B and the remaining system modules located below it by power buss 72C and switch 72S1 in the down position. Similarly when module 71 is in control of the system via its process and control module 71B, then switch 71S2 is in the up position and module 71B communicates via signal Buss 71T with the downstream modules. When module 72 is plugged into the system switch 71S2 is placed in the down position, disconnecting process and control module 71B and process and control module 72B takes over via switch 72S2 in its normally up position and Signal Buss 72T. In FIG. 5B a new power module 73 replaces power supply 71A with power supply 73A as switch 71S1 is moved to the down position disconnecting supply 71A. However, when switch 71S2 is thrown down, process and control module 71B remains in control of the system via switches 71S2 (down) and 73S2 (up) and signal Busses 73T and 71T. Placement of the new module 72 or 73 on top of the old module 71 activates the switches 71S1 and 71S2 for this purpose. In this manner, new power and control modules or new power modules may be placed into service without recompleting the system. Similarly, when the running tool and diagnostic system module 13 of FIG. 1 is placed on top of the upper power and control sub 14, the diagnostic system may be operated from its power supply and microprocessor module which are similarly switched into use automatically by switches 71S1 and 71S2.

Figure 6A:
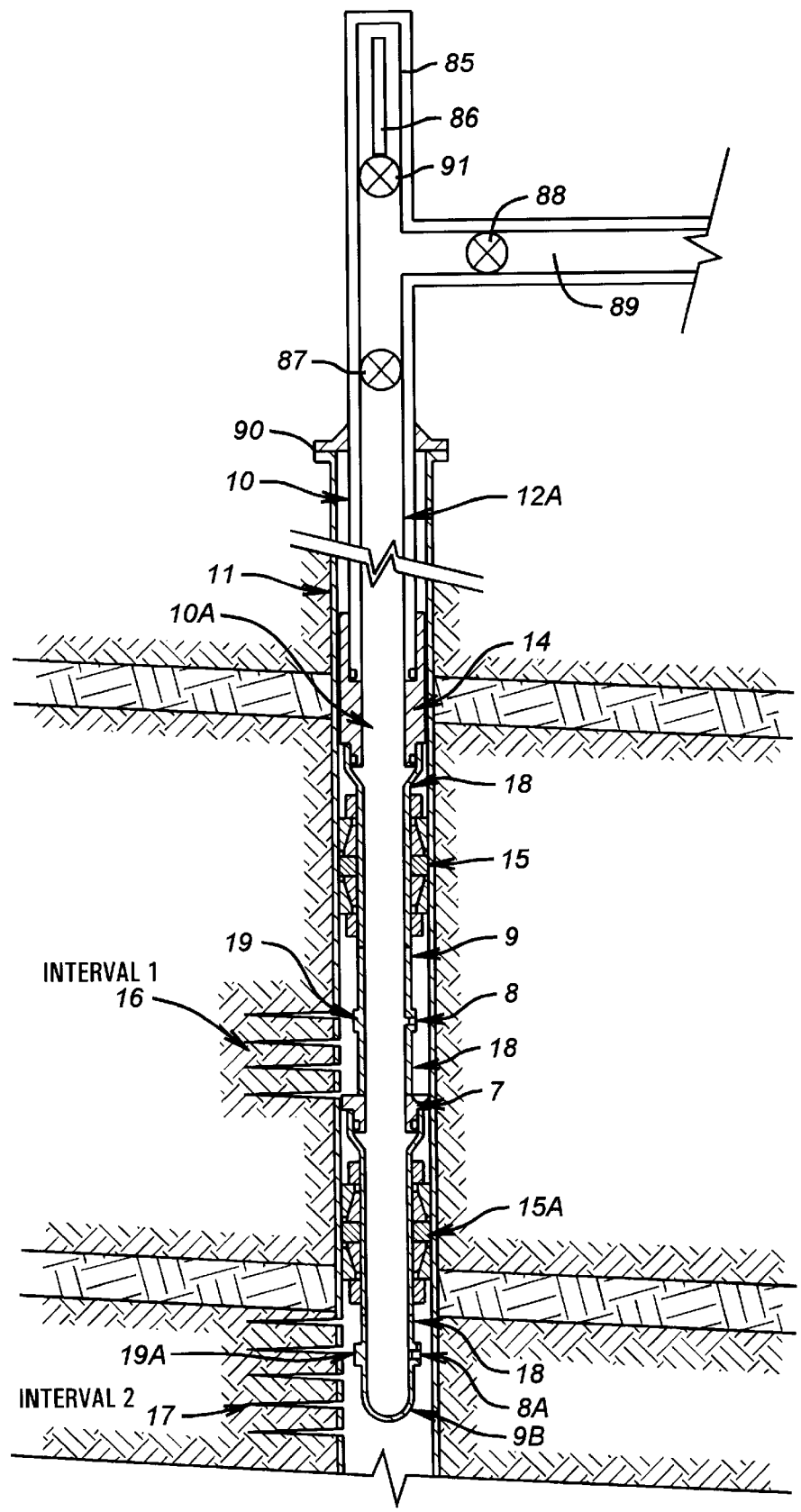
FIG. 6A is a schematic sectional view showing a remotely controllable stand alone system according to the invention deployed with the downhole well operating and control system of FIG. 1.
Figure 6B:
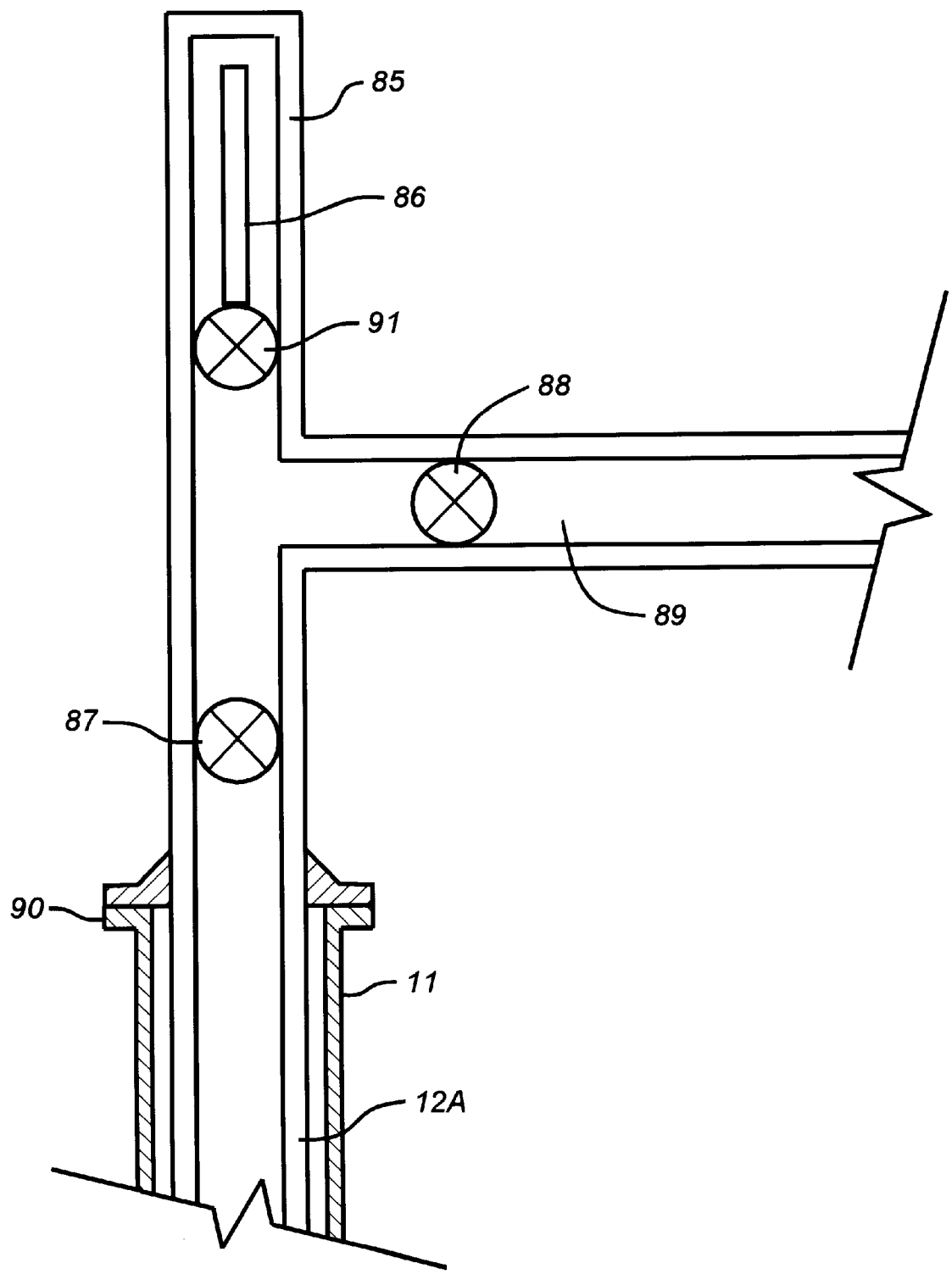
FIG. 6B shows the casing head portion of FIG. 6A in more detail.

Referring now to FIGS. 6A and 6B the remotely operated system of the present invention is shown in a partially sectional view deployed in a well borehole 11. FIG. 6B schematically shows in section the casing head portion of FIG. 6A in more detail. The portion of the system of FIG. 6A located from module 14 downwardly is the same as that described previously with respect to FIG. 1 and hence will not be repeated. In FIG. 6A the downhole system is connected to the surface via a string of production tubing 12A. At the surface tubing string 12A terminates in a tree 88 (FIG. 6B) having a master valve 91 and a production control and entry valve 87 connecting tubing 12A to a production flow line 89 which carries off produced fluids for transport or disposal. Atop the tree 88 (which is supported by casing flange 90) sits a carrier housing 85 and within it a variable buoyancy carrier 86. The carrier housing 85 is controlled via line 83 from a surface control computer 82. The computer 82 also controls valves 87, 88, and 91 in manifold 188 via control line 84.

A satellite dish antenna 80, which may be of the small 18 inch diameter Ku bond type if desired, houses a transceiver unit connected via line 81 to computer 82. The dish antenna 80 and control computer 82 form a communications system allowing a two way link via satellite with a remote located control operator (human or machine). When the remote operator desires to interrogates the memory unit of downhole control module 14, it communicates this via the satellite link 80, 81, 82 to the control computer 82. Computer 82 transmits a control signal via line 83 to housing unit 85 to set the buoyancy of the carrier module 86 to minimum (so it will sink). This signal also is used to convey the desired command to the downhole portion of the system by placing the command in the microprocessor control computer located in the carrier 86. Such commands can include those to interrogate the memory unit of the downhole control module 14 for well performance data, to reset the valves 8 and 8A of the downhole sensor modules 18 etc. as desired.

The control computer 82 also sends a signal to valves 87, 88 and 91 to temporarily shunt production from output line 89 and to open housing 85 into fluid communication with the production tubing 12A. This allows carrier module 86 and its associated electronics (a microprocessor and memory unit) to fall down production tubing 12A and land onto downhole control module 14. Carrier module 86 computer then programs the control module 14 microprocessor to carry out the desired command such as reset valves transfer sensor data from memory of module 14 to carrier module 86 etc. When the performance of the command has been finished the variable buoyancy of carrier module 86 is increased and it rises up production tubing 12A to the surface and re-enters housing 85 via valves 87 and 91. When again housed in the housing the computer can interrogate the carrier module and communicate results to the "main office".

Figure 7:
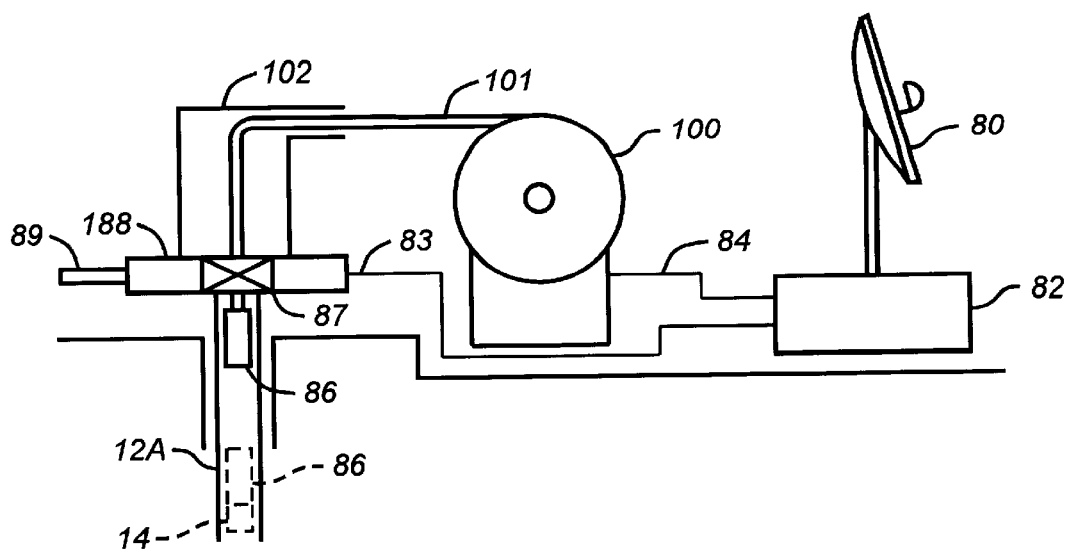
FIG. 7 is a schematic diagram showing a system deployed on dedicated coiled tubing unit at the surface.

Referring now to FIG. 7 a similar remotely controlled system to that of FIG. 6 is depicted schematically. In FIG. 7 the carrier module 86 (corresponding to FIG. 6) is deployed on a coil tubing 101 dispensed from a coil tubing roll 100. The coil tubing roll 100 is controlled by the operation of surface control computer 82 and satellite transceiver system 80 as previously described. Valve 87 in manifold 88 is controlled by computer 82 via line 83. The valve 87 is opened when command signal is received from antenna/transceiver 80. This allows carrier 86 to enter production tubing 12A where it is conducted downhole to land on the downhole control module 14 as previously described. When the desired commands have been executed the coil tubing dispenser 100 pulls tubing 101 and carrier 86 to the surface where it re-enters housing 102 via the valve 87.

Figure 8:
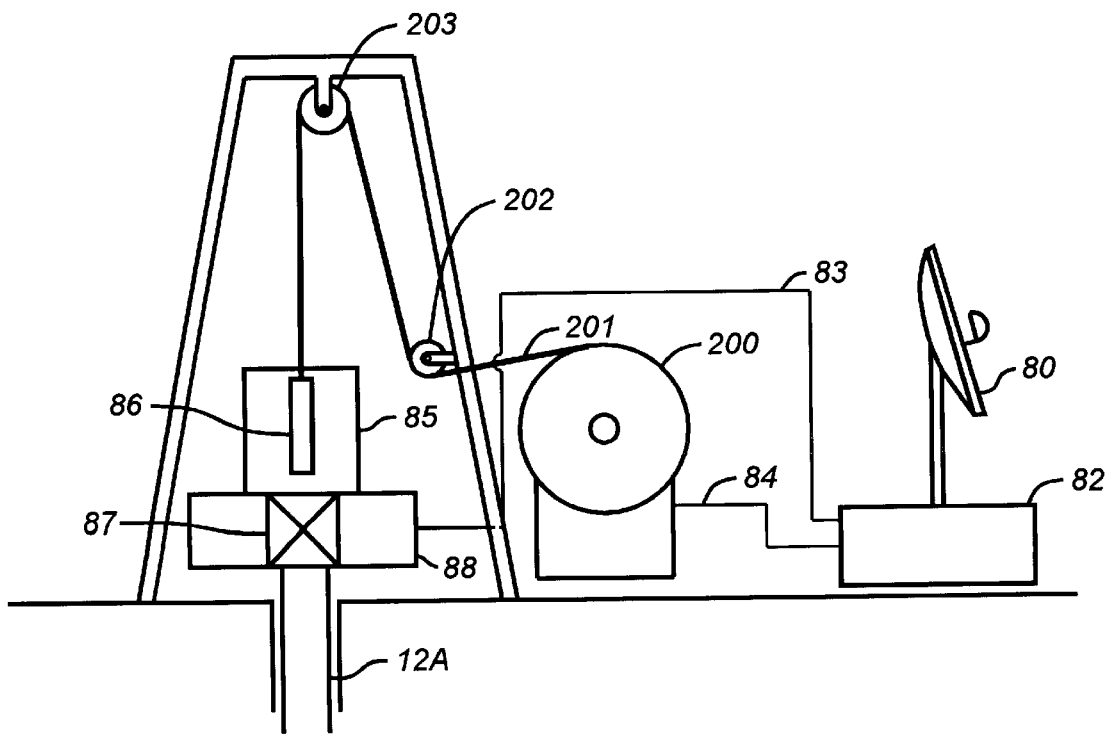
FIG. 8 is a schematic diagram showing a system deployed on a dedicated wireline unit at the surface.

Similarly, in FIG. 8 an electrical (or non-electric) wireline 201 is dispensed from a cable winch 200 via sheave wheels 202 and 203 and is connected to a carrier module 86 in a housing 85. When it is desired to command the downhole control module 14 in some manner the communications link 80 and computer 82 open valve 87 in housing 88 as before. Under control of computer 82 the winch unit 200 dispenses wireline cable 201 to lower carrier 86 into the production tubing 12A. When all commands are finished the wireline winch 200 retrieves wireline 201 and carrier 86, as before.

Figure 9:
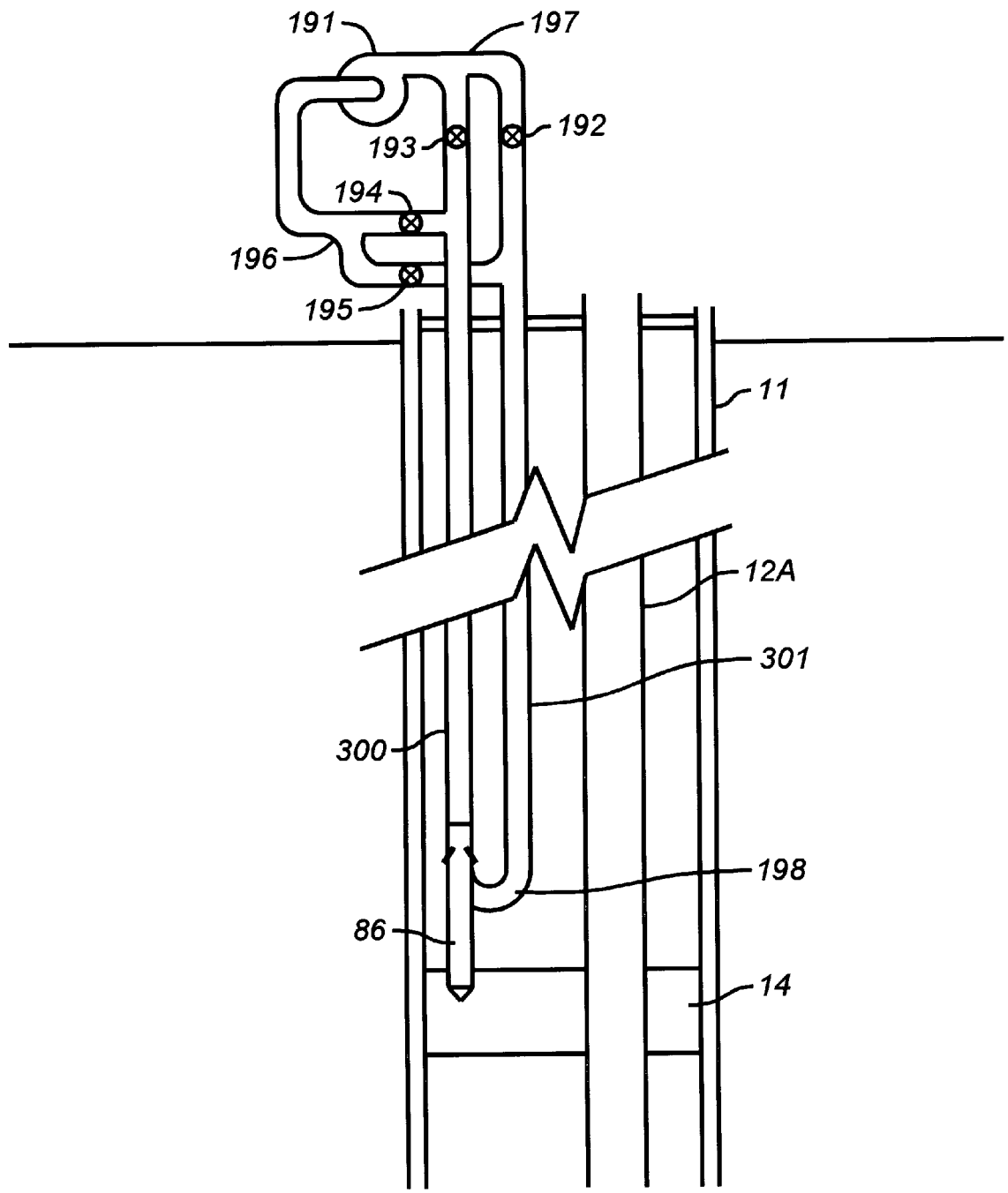
FIG. 9 schematically shows in section an alternative embodiment known as a "pump up/down" U tube arrangement for use with carrier 86 of FIG. 6A.

Referring now to FIG. 9 an alternative arrangement for moving carrier 86 (FIG. 6A) up and down in the borehole under the control of computer 82 is shown schematically. A pump 191 and valve combination comprising computer controllable valves 192, 193, 194 and 195 and carrier 86 are connected via Y members 196, 197 and 198 into a dual tubing system for sending carrier 86 up and down. With valves 193, and 195 open, and valves 194 and 192 closed, pump 191 pumps fluid down straight tubing sections 300 or 301 to "land" at Y member 198, downhole where it "stabs in" to unit 14 (FIG. 6A) and gathers data as previously described. When it is desired to return carrier 86 back to the surface the flow is reversed, sending fluid down tubing section 301 to retrieve the new module 86 through tubing 300. This type of arrangement may be described as a pump up/down U tube. Production tubing 12A remains open for continued production throughout this operation.

The foregoing descriptions may make other alternative arrangements apparent to those of skill in the art. For example, the mechanical switches described could be replaced with digital switches, if desired. The aim of the appended claims is to cover all such changes and modifications that fall within the true spirit and scope of the invention.

I claim:

1. A remotely operable downhole, self-contained, stand-alone modular well monitoring and control system for use in a completed wellbore, comprising:

a plurality of modules sized to fit inside a well borehole and on either end thereof having connections for attaching to each other in end-to-end relationship, and having electrical or hydraulic conductors for maintaining electrical or hydraulic contact on either end thereof, said plurality of modules comprising:

at least one sensor and control module, having at least one sensor for sensing well conditions in the vicinity and for generating at least one signal representative thereof and at least one flow control device which controls the flow of well fluids adjacent said sensor and control module in response to at least one control signal;

at least one power supply and monitor-control module containing a power source and control processor which monitors said representative signal and for generating said control signal;

at least one packer module to isolate said sensor and control module in a production interval; and a new module insertable into the wellbore to engage at least one of said modules to exchange information therewith or to alter performance of at least one of said modules.

2. The system of claim 1, comprising a plurality of said sensor and control modules, each comprising at least one pressure sensor.

3. The system of claim 2, wherein each of said sensor and control modules contains at least one valve for controlling the flow of well fluids through said tubing.

4. The system of claim 1 wherein said sensor and control module comprises a fluid flow meter.

5. The system of claim 1 wherein said sensor and control module comprises a water cut meter.

6. The system of claim 1 wherein said new module travels to and from the surface by variable buoyancy.

7. The system of claim 1 wherein said new module is run into the borehole and removed therefrom via wireline or oil tubing.

8. The system of claim 1, wherein said new module moves up and down in the borehole in a U-tube pump up/down system.

9. The system of claim 1, further comprising at least a pair of packer modules mounted above and below each of a plurality of sensor and control modules for effectively sealing off and isolating each such sensor and control module in distinct production intervals.

10. The system of claim 1, wherein said new module comprises a charger module for a battery-operated power source.

11. The system of claim 1 wherein said new module comprises a test and diagnostic module for testing the system.

12. The system of claim 1 wherein said new module comprises a processor means for programming or reprogramming said power supply and monitor-control module in situ in a well borehole.

13. A remotely operable, self-contained, stand-alone, modular well monitoring and control system for placement in a completed wellbore to control, under remote control, production from the completed wellbore, comprising:

a self-contained modular downhole system comprising a plurality of modules sized to fit inside a well borehole and on either end thereof, having connections for attaching to each other in end-to-end relationship and having at least one sensor and control module and at least one power supply and monitor control module for receiving signals from said sensor and control module and for sending at least one control signal thereto;

at least one packer module to isolate said sensor and control module in a production interval;

a surface system having a control computer;

a new module installable and retrievable through said tubing to engage at least one of said modules to exchange information therewith or to alter performance of at least one of said modules; and said control computer facilitating release of said new module.

14. The system of claim 13, wherein:

said control computer further comprises a remote communications link for sending or receiving commands or data to or from said control computer; and said remote communications link comprises an electrical cable link.

15. The system of claim 13, wherein:

said control computer further comprises a remote communications link for sending or receiving commands or data to or from said control computer; and said remote communications link comprises a satellite communications link.

16. The system of claim 13, wherein:

said control computer further comprises a remote communications link for sending or receiving commands or data to or from said control computer; and said remote communications link comprises an electromagnetic radiation link.

17. The system of claim 13 wherein said new module has variable buoyancy.

18. The system of claim 13, wherein said plurality of modules are supported by a tubing string and said new module is run into and out of the borehole through said tubing string on wireline or coiled tubing.

19. The system of claim 13 wherein said new module moves up and down in the borehole via a remotely controllable U tube pump up/down system.

20. The system of claim 13 wherein any computer bearing module in the system is remotely reprogrammable.

21. The system of claim 1, wherein:

said new module places at least one of said modules out of service.

22. The system of claim 1, wherein:

said new module comprises a power supply and switching so that upon contact with one of said modules, said power supply in at least one of said modules is switched offline to be replaced with said new module power supply.

23. The system of claim 1, wherein:

said new module comprises a control processor and switching so that upon contact with one of said modules, said control processor in at least one of said modules is switched offline to be replaced with said new module control processor.

24. The system of claim 1, wherein:

said plurality of modules are supported by a tubing string;

said tubing string comprising at least one side pocket mandrel;

said plurality of modules disposed in at least one said side pocket mandrel of said tubing string;

said new module entering said side pocket mandrel to connect to said plurality of modules.

25. The system of claim 14, further comprising:

a plurality of side pocket mandrels at different well intervals, each having said plurality of modules for independent control of flow control devices adjacent a plurality of intervals.

26. The system of claim 1, wherein:

said power source comprises a rechargeable battery.

27. The system of claim 26, further comprising:

said plurality of modules supported by a tubing string;

a charging unit insertable through said tubing string and into communication with at least one of said modules for selectively charging said battery.

28. The system of claim 1, further comprising:

said plurality of modules supported by a tubing string;

a diagnostic system, comprising a power supply and a microprocessor mounted to a running tool and insertable through said tubing string, connectible to at least one of said modules to communicate with said processor.

29. The system of claim 28, wherein:

said diagnostic system reprograms said processor.

30. The system of claim 28, wherein:

said diagnostic system collects information from said processor for further processing at the surface when said diagnostic system is retrieved.

31. The system of claim 24, wherein:

said new module comprises a power supply and switching so that upon contact with one of said modules, said power supply in at least one of said modules is switched offline to be replaced with said new module power supply.

32. The system of claim 24, wherein:

said new module comprises a control processor and switching so that upon contact with one of said modules, said control processor in at least one of said modules is switched offline to be replaced with said new module control processor.

33. The system of claim 24, further comprising:

at least one said side pocket mandrel mounted above said packer module.

* * * * *